United States Patent [19]

Howard et al.

[11] Patent Number: 4,661,932
[45] Date of Patent: Apr. 28, 1987

[54] DYNAMIC DOWNHOLE RECORDER

[75] Inventors: Mig A. Howard, Houston; Louis H. Barnard, Pasadena, both of Tex.

[73] Assignee: Hughes Tool Company - USA, Houston, Tex.

[21] Appl. No.: 561,487

[22] Filed: Dec. 14, 1983

[51] Int. Cl.$^4$ .......................... G01V 1/00; G01D 9/00
[52] U.S. Cl. ........................................ 367/25; 73/151; 346/33 WL; 364/422; 367/60; 367/69
[58] Field of Search ............... 181/102, 103, 104, 105, 181/107, 122; 175/40; 340/861; 346/33 WL, 33 C, 33 P; 364/422; 367/27, 34, 35, 50, 55, 60, 68, 69, 86, 140, 149, 178, 912; 73/151

[56] References Cited

U.S. PATENT DOCUMENTS

| | | | |
|---|---|---|---|
| 3,315,224 | 4/1967 | Ferguson | 343/33 WL |
| 3,333,247 | 7/1967 | Hadley et al. | 367/60 |
| 3,340,499 | 9/1967 | Hadley | 367/60 |
| 4,216,536 | 8/1980 | More | 367/25 X |
| 4,303,997 | 12/1981 | Tanguy | 367/35 |
| 4,350,979 | 9/1982 | Eberweih | 340/861 |
| 4,468,665 | 8/1984 | Thawley et al. | 340/856 |
| 4,506,263 | 4/1985 | Sidhwa | 367/76 X |
| 4,570,234 | 2/1986 | Baach | 346/33 WL |

FOREIGN PATENT DOCUMENTS 2096318A 10/1982 United Kingdom .................. 367/25

OTHER PUBLICATIONS

Prothero, Jr., William A., A Digital Event-Recording Ocean Bottom Seismometer Capsule, Marine Geophysical Research (1977), pp. 119-141.
Lynes RES TM -300 System.

Primary Examiner—Deborah L. Kyle
Assistant Examiner—Brian S. Steinberger
Attorney, Agent, or Firm—James E. Bradley

[57] ABSTRACT

A method and apparatus allows dynamic data to be recorded in a drill string for later playback at the surface. The system includes a transducer located in a sub in the drill string which provides electrical responses to a analog to digital converter. A timer circuit provides timer pulses to the converter to cause the response to be converted into a digital value for storing in a recorder. The timer pulses are also used to address the memory location. The timer circuit has the ability to provide a variable number of timer pulses at a variable frequency and at variable intervals. A surface timer circuit provides simultaneous timer pulses to a counter to indicate at the surface which memory location is being filled at any given time.

2 Claims, 6 Drawing Figures

DYNAMIC DOWNHOLE RECORDER

BACKGROUND OF THE INVENTION

1. Field of the Invention

This invention relates in general to digital recorders, and in particular to a means for recording dynamic data by a recorder located in a borehole.

2. Description of the Prior Art

In rotary drilling applications, a string of drill pipe is rotated, with a rotary drill bit located on the end. Normally, drilling mud is pumped through the string of the drill pipe to return up the annulus of the borehole. Often, the well is thousands of feet deep.

It would be desirable to record certain parameters while drilling. For example, recording pressure variations caused by a pressure fluid pressure oscillator such as generally described in U.S. Pat. No. 3,405,770, Galle et al, Oct. 15, 1968, would be useful. The recorder should be able to record the dynamic pressure to determine the frequency and amplitude of the pressure variations. There are no prior art recorders known that will record dynamic pressure changes downhole for later evaluation at the surface. A prior art downhole digital recorder is known, but this recorder will take only a single average reading at selected intervals.

SUMMARY OF THE INVENTION

In this invention, a digital recorder is provided for placement in a sub for lowering into the well bore. Transducer means is located in or adjacent to the sub for sensing a parameter and providing an electrical response corresponding thereto. An analog to digital converter converts the electrical response to a digital value for storing in the memory of the recorder. A timer circuit has a series of gates and clocks for providing after a selected time delay and at selected intervals a selected number of pulses. These pulses simultaneously cause the converter to provide a value to the memory, and also address the memory for placement of the value in the next sequential memory location. The timer allows recording of dynamic data in the memory of the recorder.

At the surface, an identical timer completely independently of the downhole timer provides pulses simultaneously to a counter. The counter displays the particular address location that is being addressed downhole at that precise time. This enables the operator to observe the drilling conditions and make a record for later evaluation of the downhole information. After retrieving the recorder, the recorder information can be converted to analog values in a conventional manner.

DESCRIPTION OF THE PREFERRED EMBODIMENT

Figures 1, 2:
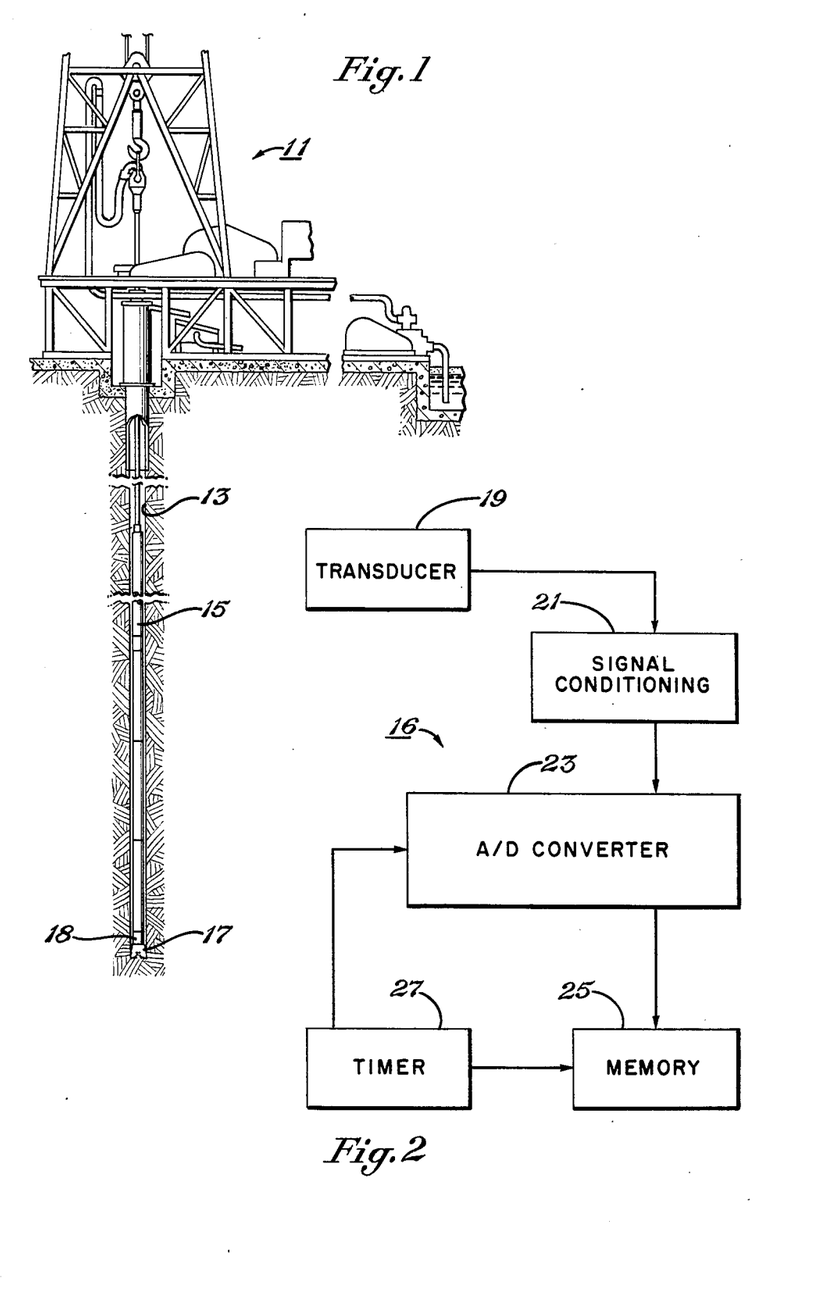
FIG. 1 is a schematic view illustrating a drilling rig drilling a borehole.
FIG. 2 is a block diagram illustrating the downhole recording assembly.

Referring to FIG. 1, a typical drilling rig 11 is shown drilling a borehole 13 in the earth. The drilling rig rotates a tubular drill string 15 which has a drill bit 17 on the bottom for drilling the borehole 13. The drill string 15 contains a fluid oscillating tool (not shown), such as generally described in U.S. Pat. No. 3,405,770 and other patents for causing drilling fluid pressure oscillations. The dynamic pressure of the drilling fluid is recorded by a downhole recording assembly 16 (FIG. 2) lcoated in a sub 18.

Referring to FIG. 2, one or more conventional transducers 19 will be located in or near sub 18 for recording various parameters, such as the pressure of the drilling fluid. Transducer 19 is connected to a signal conditioning circuit 21 which filters and amplifies the condition being sensed in a normal manner. Transducer 19 and signal conditioning circuit 21 together serve as transducer means for sensing a parameter and providing an electrical response corresponding thereto.

The electrical response is provided toa conventional analog to digital converter 23. The converter 23 converts the electrical response at its input to a digital value upon receipt of a clock or timer pulse. The value converted into digital form is then applied to and stored in a memory means 25, which includes a conventional RAM (random access memory). In the preferred embodiment, the RAM comprises four separate chips with a total capacity of 32,768 bytes (32k bytes). A timer circuit 27 also located in sub 18 provides the timer pulses to the A/D converter 23. The timer circuit 27 also provides the timer pulses to a couner that is part of the memory means 25. The counter produces a binary number corresponding to the timer pulse, which addresses the memory to the next sequential location. This places the RAM within the memory means 25 in position for receiving the next digital value.

The timer circuit 27 has a start delay, which can delay the start of the timer pulses until the drill string 15 has been run into the hole and has started drilling. In the preferred embodiment, the start delay can be set anywhere between one and nine hours. Also, the timer circuit has a variable rate at which the samples will be recorded. Preferably, the sample rate can be varied from two samples per second to 2,048 samples per second. In addition, the timer circuit has a variable number of samples that it will take during each sampling interval. In the preferred embodiment, it has the ability to take anywhere between eight samples and 1,024 samples during each sampling interval. In addition, the timer circuit provides a variable delay between sampling intervals. The delay between the starting of each interval can be set between two minutes and 128 minutes. The timer circuit 27 thus serves as selection means for providing to the memory means 25 at selected intervals a plurality of the digital values at a selected frequency.

An identical timer circuit to timer circuit 27 is located at the surface to indicate to the operator what particular memory location is being addressed at any particular time. The timer circuit 27 thus serves as selection means for providing to the memory means 25 at selected intervals a plurality of the digital values at a selected frequency.

Figure 3:
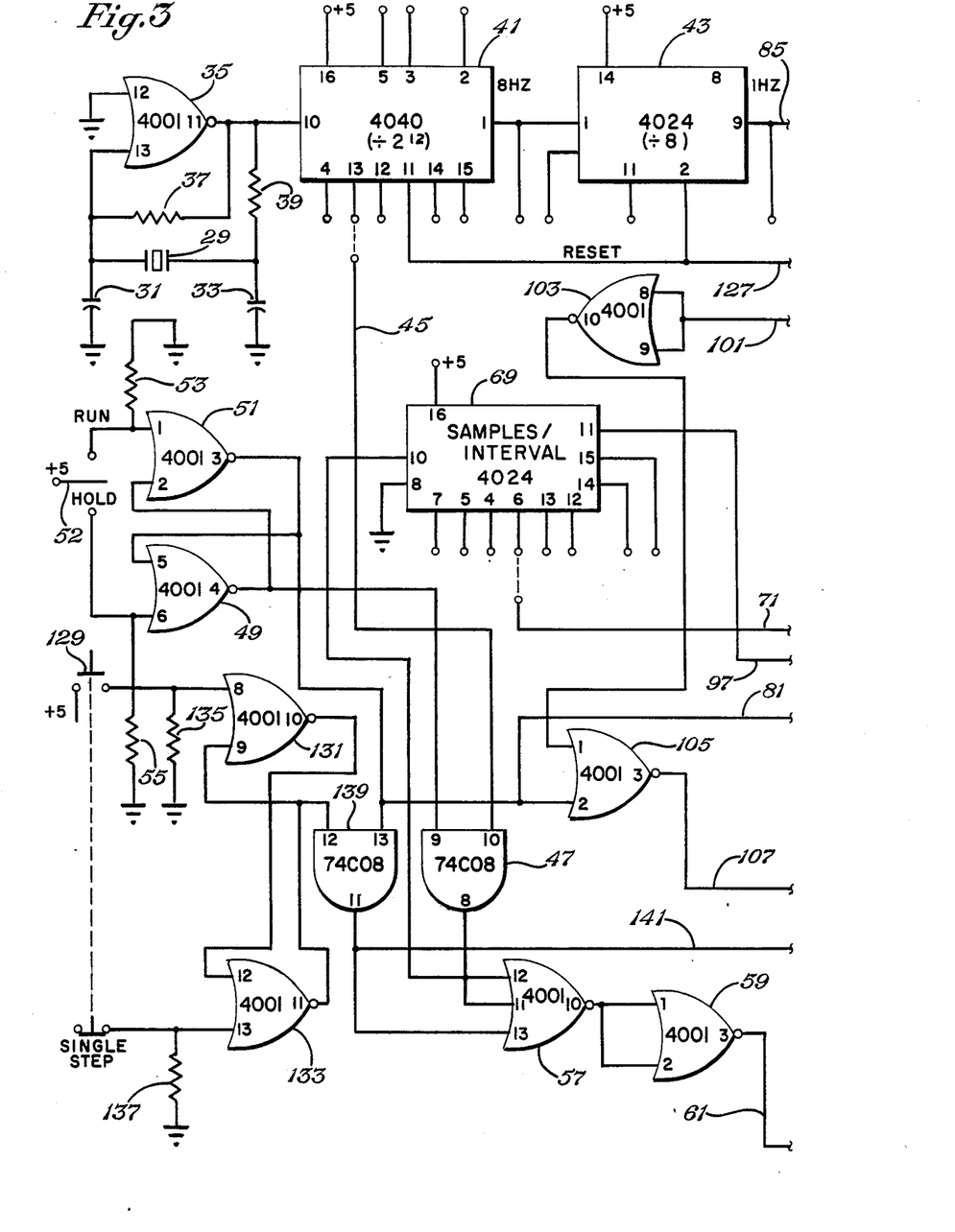
FIGS. 3 and 4, connected together, illustrate the timer circuit of the downhole recording assembly.
Figure 4:
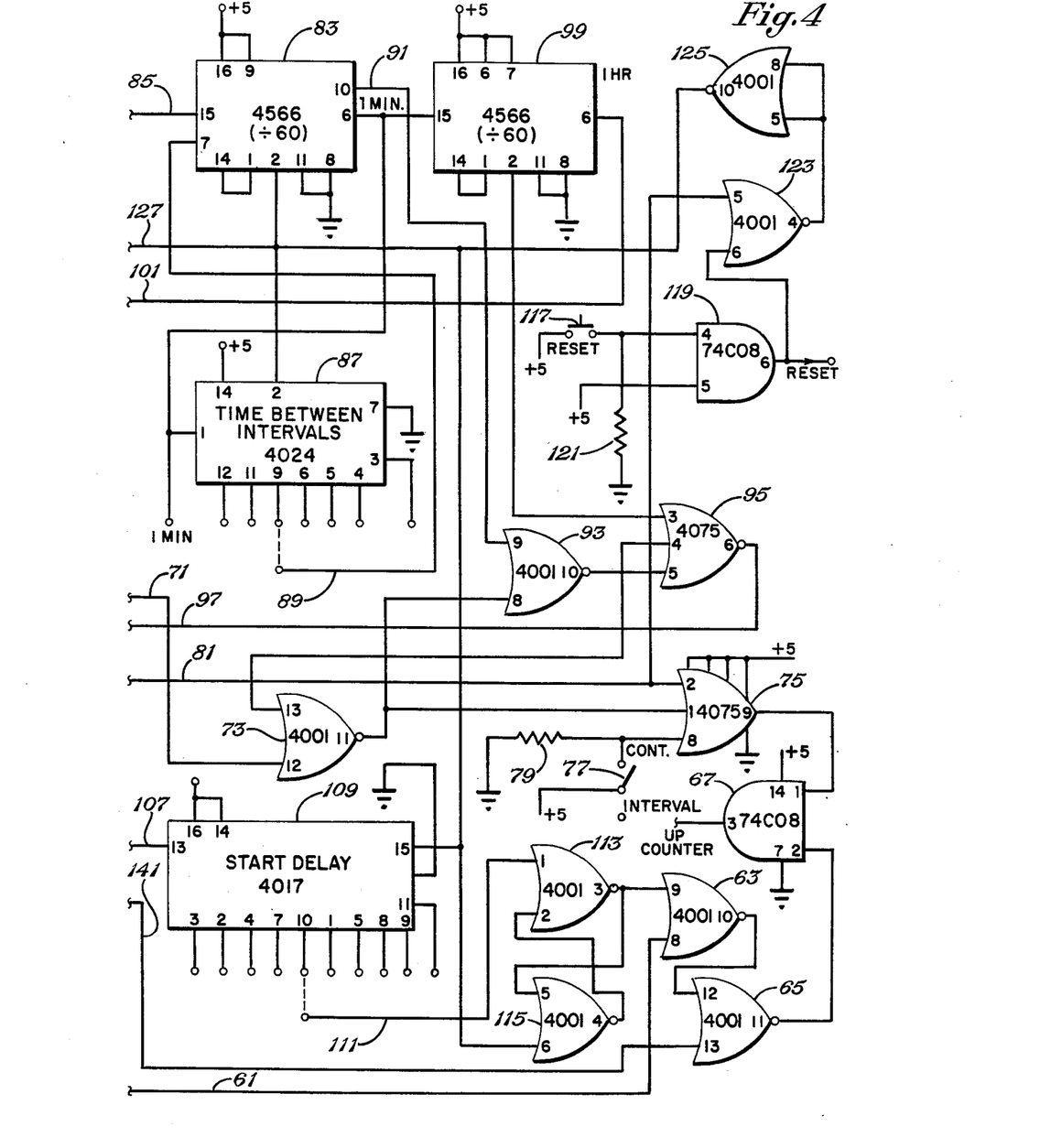

The downhole timer circuit in FIGS. 3 and 4 is made of conventional components which are labeled in the drawing with the preferred chip number to indicate the type of circuit, function and internal components. A crystal clock 29 provides a 32.768 khz signal. Conventional circuitry is associated with the clock 29, including capacitors 31 and 33 connected to ground. Capacitor 31 is connected to one input of a NOR gate 35. A resistor 37 is connected between the capacitor 31 and the output of NOR gate 35. A resistor 39 is connected between the output of the NOR gate 35 and capacitor 33.

The signal is applied to a clock rate divider circuit 41 which is a binary counter that divides by 2 to the 12th power on output pin 1. This provides an 8 HZ (cycles per second) signal at pin 1 to another binary counter or divider circuit 43, which divides by 8 on its output pin 9. This results in a one HZ signal on output pin 9 of divider 43. An output line 45 may be connected by means of a switch to any selected output pins 2, 3, 4, 5, 12, 13, 14, 15 of divider 41. The binary number for each pulse from clock 29 occurs at these output pins. Also, line 45 can be connected through a switch to two of the output pins from divider 43. Placement of the switch will provide a signal on line 45 that has a frequency that can be varied from two cycles per second to 2,048 cycles per second. The switch is shown connected to pin 13, which provides timer pulses at the rate of 128 per second. The timer pulses or signals on line 45 are applied to an AND gate 47. Normally, this signal will pass through the AND gate 47 since the other input of AND gate 47 will be normally high. This other input is connected to a NOR gate 49 which is interconnected with a NOR gate 51 and to a run or hold switch 52. In the hold position, a low will result at input pin 9 of AND gate 47, preventing the pulses from passing through. In the run position, the pulses on line 45 will pass through AND gate 47. NOR gate 51 is connected conventionally, and has a resistor 53 to ground at its pin 1 input. NOR gate 49 has its pin 6 input connected to ground through a resistor 55.

The output of AND gate 47 leads to a three input NOR gate 57. The signals will normally pass through to a NOR gate 59, which inverts the signals and passes them through on line 61. Referring to FIG. 4, from line 61, the pulses are applied to the NOR gate 63. If the input pin 9 is low, the signal will pass through the NOR gate 63 to a NOR gate 65. If the input pin 13 is low, the signals will pass through NOR gate 65 to an AND gate 67. If the input gate 1 of AND gate 67 is high, the timer pulses will pass to the up counter portion of the A/D converter 23 (FIG. 2) to cause it to pass an additional digital number to memory 25 (FIG. 2). Simultaneously, the up counter signal from the AND gate 67 will pass to a counter located within the memory unit 25. This counter will convert the pulse to a binary number and address the RAM to place the digital values from the A/D converter within respective digital memory locations.

Referring again to FIG. 3, the first timer pulse passing to the AND gate 67 is counted by a divider or counter 69 labeled "samples per interval". Counter 69 is a binary counter that counts each pulse from divider 41 that passes to the AND gate 67, and provides a binary output on its pins 4, 5, 6, 7, 12, 13, 14 or 15. Because of the characteristics of binary numbers, the pins change from high (1) to low (0) as the pulses are counted. For example, on the eighth pulse that it has received, it will provide a high on pin 7 for the first time. On the 16th pulse, pin 5 will go high for the first time. On the 32nd pulse, pin 4 will go high. A line 71 can be connected by a switch to any one of the desired output pins on the counter 69. It is shown connected to pin 6, which will go high after 64 pulses.

Line 71, as shown in FIG. 4, leads to a NOR gate 73. The output from NOR gate 73 is connected to a 3 input OR gate 75. One of the inputs of OR gate 75 is connected to a switch 77 which allows continuous running or interval sampling. In the interval sampling, which is the normal mode, it will have a low at input pin 8. Resistor 79 is also connected to input pin 8 and to ground. OR gate 75 also has an input pin 2 which is connected to a line 81. Line 81, as shown in FIG. 3, is connected to the output from NOR gate 51, which is normally low when in the run position. In order for pulses to pass through AND gate 67, there must be a high input at pin 1 of OR gate 75 to provide a high output to the AND gate 67 and enable the pulses to proceed to the UP counter. Line 71 thus must be low for timer pulses to pass to the A/D converter 23 (FIG. 2) and memory means 25 (FIG. 2).

Once the number of samples counted by the counter 69 reaches the number to which line 71 is connected, however, line 71 will go high for the first time and remain high until reset. In the embodiment shown, after 64 pulses, line 71 would go high. As shown in FIG. 4, the high input to NOR gate 73 results in a low input to OR gate 75. The low output to the AND gate 67 prevents additional pulses from passing through until line 71 goes low again. This depends on how much time is set between sampling intervals.

Referring to FIG. 4, the delay between sampling intervals is handled by a divider 83 which has at its input 15 (line 85) the one HZ signal from the divider 43. Divider 83 divides by 60 to provide a one cycle per minute signal on its output line 6. This signal is applied to a binary counter 87 which provides a binary output. Counter 87, similar to counter 69, counts each one minute cycle and will provide high and low outputs on its pins 3, 4, 5, 6, 9, 11, and 12 depending upon the number of the pulse counted. In the preferred embodiment, after two minutes, pin 12 will go high. After four minutes, pin 11 will go high. After eight minutes, pin 9 will go high. A line 89 has a switch that will connect to any of these pins and it is shown connected to line 9. Consequently eight minutes after the pulse from divider 41 started, line 89 will go high. Line 89 is applied to input pin 7 of the divider circuit 83, 83. Divider circuit has within it a multivibrator portion which will provide a toggle pulse on line 91 when pin 7 goes high. This momentary high pulse is applied to a NOR gate 93, resulting in a low output, which is applied to an OR gate 95. This results in a low output from OR gate 95 to line 97. The low toggle signal is applied to pin 11 of the counter 69 (FIG. 3), which resets the counter 69 to allow it to start counting again from zero. Also, at that time, the high output on pin 6 of counter 69 will go to low, enabling the AND gate 67 (FIG. 4) to again pass pulses through to the A/D converter 23 (FIG. 2) and the addressing portion of the memory means 25 (FIG. 2).

The circuitry that delays the starting of the timer pulses for several hours includes a divider 99 shown in FIG. 4. Divider 99 receives a one minute per cycle input at pin 15 and provides a one hour per cycle output on pin 6. Divider 99 thus divides by 60 with the output line 101 leading to a NOR gate 103, shown in FIG. 3. This signal is passed on through a NOR gate 105 to a line 107. NOR gate 105 will normally pass the signal through, unless the run hold switch 52 is in the hold position. Referring again to FIG. 4, the one hour signal is applied on line 107 to a start delay counter 109. Counter 109, similar to the counters 69 and 87, has binary outputs, which are low or high depending upon the binary equivalent of the desired number of hours or counts that has passed. In the preferred embodiment, after two hours from an input pulse, pin 12 will go high for the first time. After four hours have passed, pin 11 will go high for the first time. After eight hours, pin 9 goes high for the first time. A line 111 can be connected by a switch to any of the output lines and is shown connected to pin 9, which goes high eight hours from the time the circuitry is initialized at the surface. Line 111 leads to a NOR gate 113. While line 111 is still low, the output from NOR gate 113 will be high, preventing any pulses on line 61 from passing through the NOR gate 63. When line 111 goes high, however, a low output will result from the NOR gate 113, providing a high output, and enabling the NOR gate 63 to pass the signals through. NOR gate 113 is connected in a conventional manner to a NOR gate 115.

The circuitry is reset back to zero by means of a reset switch 117, as shown in FIG. 4. Reset switch 117 applies five volts to the input of an AND gate 119. AND gate 119 is connected to a resistor 121 to ground in a normal manner. The two high outputs provides a high to a NOR gate 123. The other input to the NOR gate 123 is connected to line 81, which as shown in FIG. 3 is normally low. The high input thus provides a low output on NOR gate 123, which is inverted by a NOR gate 125 into a high output on line 127. The high pulse on line 127 is connected to pins 2 of dividers 99, 83 and 43 and pin 11 of divider 41. This resets each to zero. The reset pulse is also applied to pin 3 of OR gate 95, which provides an output on line 97 to counter 69 to reset this counter.

Calibration of the transducer 19 (FIG. 2) is possible through a single step switch 129, as shown in FIG. 3. Single step switch 129 is connected to a NOR gate 131, which is interconnected with a NOR gate 133. The input pin 8 of NOR gate 131 is connected to ground through a resistor 135. Similarly, a resistor 137 connects the input pin 13 of the NOR gate 133. The outputs of the NOR gates 131 and 133 are connected to an AND gate 139, which has an input connected to NOR gate 57 and to a line 141. Placing switch 52 in the hold position and depressing switch 129 will cause a pulse to pass through the AND gate 139 and to the NOR gate 65 (FIG. 4) on lne 141, providing a pulse to the converter 23 (FIG. 2) and addressing a portion of memory 25 in (FIG. 2). Normally, a few pulses with a zero voltage to the converter 23 are placed in the memory by depressing switch 129. Then, a few pulses at a calibrated preset voltage to the converter 23 are placed by stepping the switch 129. Actual data will be stored beginning at about the tenth memory location.

Figure 5:
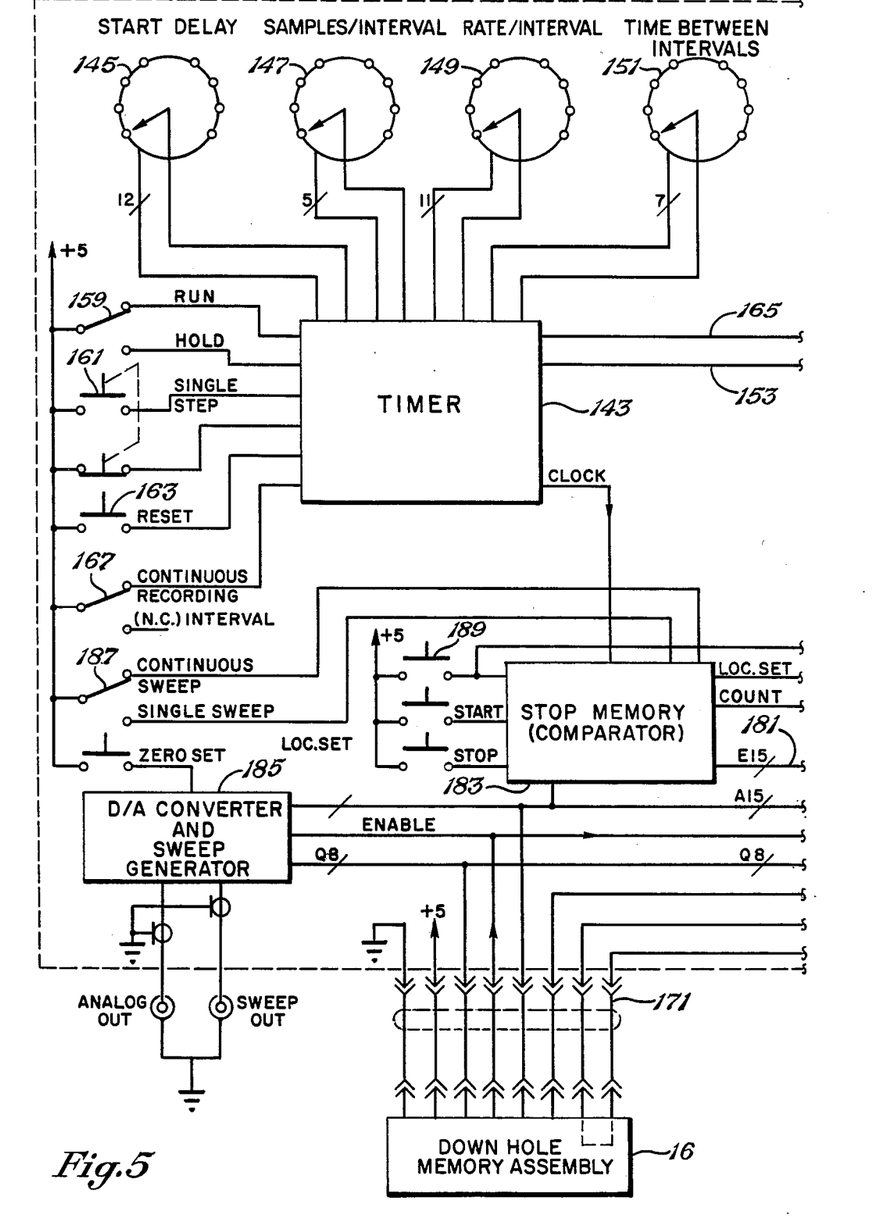
FIGS. 5 and 6, connected together, show a block diagram of the surface equipment for the system.

Referring to FIGS. 4 and 5, the surface equipment includes a timer circuit 143 that is identical to the timer circuit 27. It has switches 145, 147, 149 and 151, all of which can be varied to provide after selected delay a selected number of pulses at selected intervals and at a selected rate. Switch 145 determines the amount of delay before the pulses will be provided from the timer circuit 143. Switch 147 determines the number of pulses that will be counted during each sampling interval. Switch 149 determines the frequency or rate of which the sample pulses will be sampled during the sampling interval. Switch 151 determines the amount of time between the start of each sampling interval.

Figure 6:
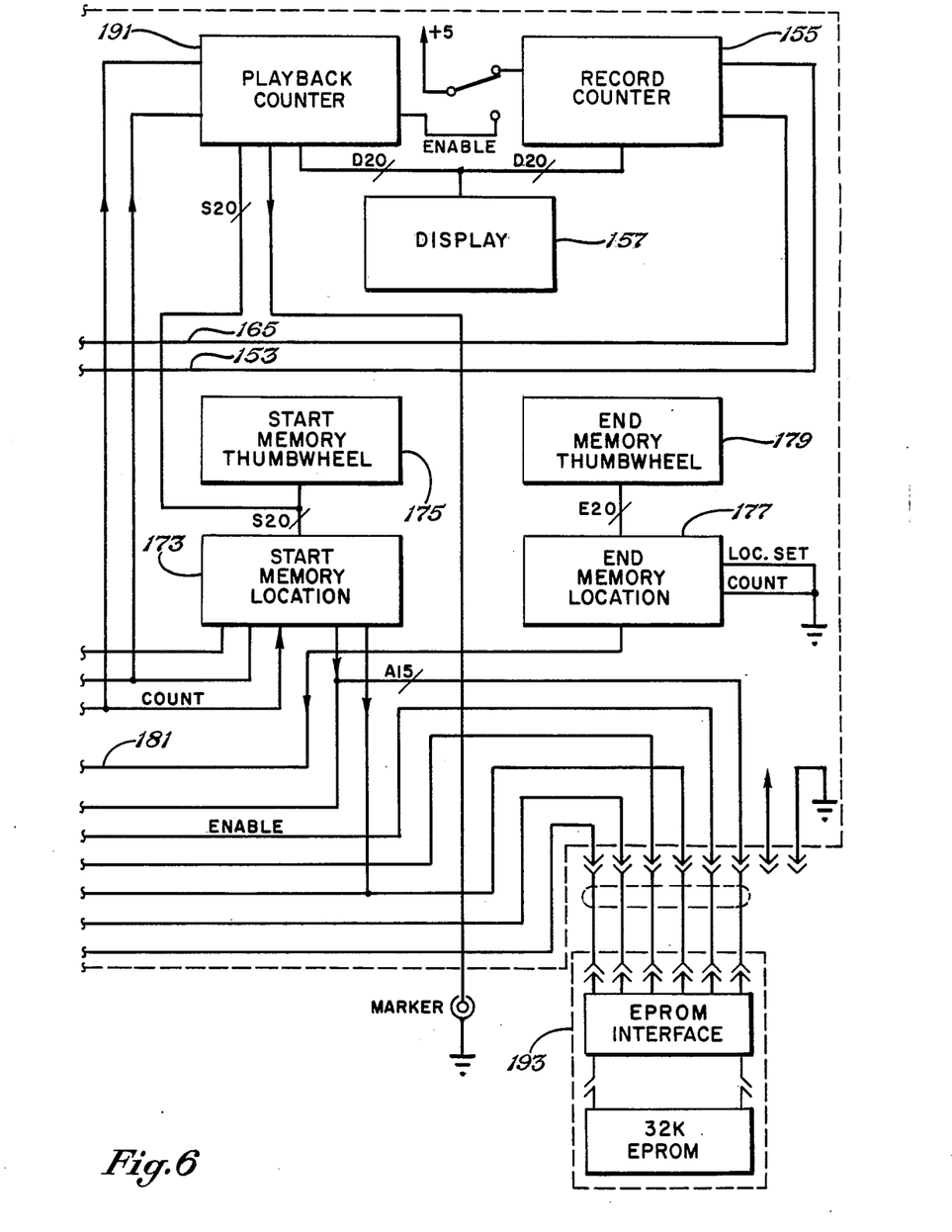

The timer pulses are produced on line 153 to a record counter 155 (FIG. 6). The counter 155 counts the pulses and displays in a decimal number in a display 157 each particular count. For example, in the preferred embodiment there are 32,768 (32k) memory locations, thus the display will display from zero to 32,768 (32k). The record counter 155 will provide a new number in display 157 each time it receives a timer pulse from timer 143.

Timer 143 will be set to provide timer pulses at the same rate and numbers as the timer circuit 27 downhole. Timer circuit 143 will be initialized at the surface simultaneously with the timer circuit 27. Consequently, the clocks delaying the starting of the timer pulses will begin simultaneously both for timer circuit 143 and timer circuit 27. After the several hours of delay pass according to what is selected, the timer circuit 27 downhole will cause a first value to be placed into a first memory 25 location, immediately following calibration memory locations. The timer circuit 143 will simultaneously provide a timer pulse on line 153 to the counter 155, displaying the location of the first parameter value speed. Each additional pulse provided by the downhole timer circuit 27 will have a corresponding timer pulse from the surface timer circuit 143, to indicate each additional memory location. An operator at the surface will thus be able to record at what time of the day a particular memory location was filled. This can be correlated with other information known, such as the drilling rate, weight on the bit and conditions of the drilling mud at that particular time.

The timer circuit 143 has a switch 159 which enables it to be placed in the hold position for stepping the single switch 161 through during calibration. If the first ten memory locations are devoted to single step switching for calibration, then the first ten can be stepped through the switch 161. A reset switch 163 resets all of the counters in the same manner as the downhole timer circuit 27. A switch 167 allows continuous or interval recording.

After all of the 32k memory locations have been filled downhole, there will be no more recording. Eventually, the drill string will be pulled, and the downhole recorder removed from the sub 18. The downhole memory assembly 16 can be placed into a plug input 171, as shown in FIG. 5, to read the values stored in the RAM. If desired, the memory can be entirely read out conventionally in the sequence it was stored. Also, if desired, there are provisions for starting and stopping the memory locations if only certain portions of the recordings are of interest. As shown in FIG. 6, a start memory 173 circuit has a thumb wheel 175 to enable an operator to begin at which particular memory location he wishes to play out the data. Also, there is an end memory circuit 177, which has an end memory thumb wheel 179. The end memory circuit 177 is connected by lines 181 to a comparator 183. Comparator 183 will stop the readout of data from the RAM when the particular address that it is reading reaches the address that is set on the lines 181.

The data is readout from the RAM in a conventional manner, using a digital to analog converter 185. In the embodiment shown, the digital to analog converter 185 includes a sweep generator for connection to an X/Y printer (not shown). The digital values stored in the RAM are sequentially read and converted into analog values. A switch 187 is connected with the D/A converter 185. In the continuous mode, switch 187 will repeatedly sweep between the start and stop memory locations, allowing one to generate a waveform at the output. Additionally, one may place the switch 187 in the single sweep position, which will simply read the data one time, then stop. A switch 189 connected with the comparator 183 begins the readout of the data. During the readout, a playback counter 191, FIG. 5, counts the addresses as they are being read, and displays the values through display 157. The values in the RAM can be read at rates completely independent of the rates at which they were put in, without needing to stop for the delay intervals used during the writing of the values into the RAM. Also, the values in the downhole memory assembly 16 can be simultaneously stored in a permanent memory 193, FIG. 5, as the values are being read.

In the overall operation, while the downhole recorder is still at the surface, and immediately before running into the hole, one must select the amount of start delay before the system will begin recording, select the frequency at which one wishes to record samples, select the number of samples to be taken during each sampling interval, and select the amount of delay between sampling intervals. As shown in FIGS. 3 and 4, the start delay is selected by positioning the switch of line 111. The frequency is selected by positioning the switch of line 45. The number of samples taken per sampling interval is selected by positioning the switch of line 71. The time delay between the start of sampling intervals is selected by positioning the switch of the line 89. Once these are set, the same values are set on the switches 145, 147, 149 and 151 of the surface equipment.

Then, switch 52 of the downhole recorder and switch 159 of the uphole recorder are switched to the run position simultaneously. The recorder assembly 16 is loaded into its sub 18, and the drill string 15 is lowered into the well for drilling. Timer pulses of the desired frequency will occur on the line 45. These pulses will pass through AND gate 47, NOR gate 57, NOR gate 59 and to NOR gate 63. The pulses will not proceed any farther until input pin 9 of NOR gate 63 becomes low. It will become low when line 111 becomes high from the start delay circuit 109. These pulses then will be allowed to proceed on through the NOR gate 65 to the AND gate 67 and to the A/D converter 23 (FIG. 1). The pulses are also applied to the addressing portion of the memory means 25 (FIG. 2).

The pulses applied to the AND gate 67 are being counted by the counter 69. Once the selected number of pulses have passed, line 71 will go high. The high on line 71 passes through NOR gate 73 to OR gate 75, providing a low at the AND gate 67 pin 1, preventing any additional pulses from passing to the A/D converter 23. This starts the time delay between sampling intervals. Since the closing of the switch 52 to the run position, a counter 87 has been receiving a one minute per cycle count at its input pin 1. It provides on line 89 a high output after eight minutes, or at whatever interval has been selected. The high output passes to a multivibrator section within the divider 83, producing a toggle output pulse on line 91. The toggle output proceeds through a NOR gate 93 and an OR gate 95 to provide a reset output on line 97 to the counter 69, FIG. 3. This enables the counter 69 to again count a selected number of pulses for the next interval. In this manner, dynamic data sampled by the transducer 19 can be stored.

The timer 143 at the surface will be providing pulses simultaneously to the counter 155 to display to the operator which particular memory location is being filled at any given time. After completion of the filling of the memory and the pulling of the drill string, the recorder information is played out in a conventional manner by D/A converter and sweep generator 185.

The invention has significant advantages. The recorder will record dynamic data, allowing a frequency and amplitude curve to be plotted. The data can be sampled at variable intervals. The number of sample points is variable, as well as the frequency at which the samples are taken. The dual timer circuits in the recorder and at the surface allows one at the surface to keep a record of the conditions occuring as each memory location is being filled.

While the invention has been shown in only one of its forms, it should be apparent to those skilled in the art that it is not so limited but is susceptible to various changes without departing from the scope of the invention.

We claim:

1. A system for recording information in a borehole, comprising in combination:
    a string of drill pipe for drilling a borehole;
    a sub adapted to be mounted in the string of drill pipe;
    transducer means carried in the string of drill pipe and located in the vicinity of the sub for sensing a parameter in the borehole and providing an electrical response corresponding thereto;
    converter means in the sub connected to the transducer means for providing a digital value corresponding to the electrical response of the transducer means upon the receipt of a timer pulse during a sampling interval;
    digital memory means in the sub, upon receipt of each of the timer pulses, for addressing a new memory location and storing the digital value produced by the converter means;
    downhole pulse means in the sub for providing the timer pulses to the converter means and to the memory means during each sampling interval, and for providing the timer pulses free of any simultaneous control from the surface;
    selection means in the sub for preselecting prior to lowering the sub into the borehole a time delay before the pulse means provides timer pulses, a total number of pulses to be provided at each sampling interval, a frequency at which the pulses are provided during each sampling interval, and a time between each sampling interval; and
    surface timer means at the surface for providing to a counter timer pulses substantially simultaneously with the timer pulses of the downhole pulse means, to allow one at the surface to know which particular memory location is being filled downhole at any given time.

2. A method for recording in a downhole digital recorder responses from a transducer in a borehole, comprising:
    providing with the recorder a pulse means for providing downhle timer pulses during a sampling interval, a converter means for converting the transducer response upon receipt of one of the downhole timer pulses to a digital value, and a digital memory means having a plurality of memory locations for storing one of the digital values in each memory location upon receipt of one of the downhole timer pulses;
    preselecting at the surface prior to lowering the recorder into the borehole, a time delay before the pulse means provides the downhole timer pulses, a frequency at which the downhole timer pulses are provided during each sampling interval, and a duration between each sampling interval; then lowering the recorder into the borehole; then after the selected time delay, providing to the memory means and converter means a plurality of the downhole timer pulses with the pulse means, and providing the downhole timer pulses at the selected sampling intervals and at the selected frequency;

addressing a new memory location in the memory means upon receipt of each of the downhole timer pulses;

converting with the converter means the transducer response to a digital value upon receipt of each of the downhole timer pulses and providing the digital value to the particular memory location being addressed; and at the surface, providing to a counter a plurality of surface timer pulses simultaneously with each downhole timer pulse, and displaying with the counter the sequential number of each of the surface timer pulses, to determine which particular memory location is being addressed at that time.

* * * * *

UNITED STATES PATENT OFFICE
CERTIFICATE OF CORRECTION

Patent No. 4,661,932                      Dated April 28, 1987

Inventor(s) Mig Howard et al

It is certified that error appears in the above-identified patent and that said Letters Patent are hereby corrected as shown below:

At column 2, line 17, "toa" should be --to a--;

At column 4, line 27, "whichhas" should be --which has--;

At column 4, line 61, "passedon" should be --passed on--;

At column 8, line 55, "downhle" should be --downhole--.

Signed and Sealed this

Twenty-second Day of December, 1987

Attest:

DONALD J. QUIGG

Attesting Officer

Commissioner of Patents and Trademarks